United States Patent [19]

Takeuchi et al.

[11] Patent Number: 4,593,801

[45] Date of Patent: Jun. 10, 1986

[54] CLUTCH

[75] Inventors: Hiroshi Takeuchi, Osaka; Hirotaka Fukushima, Hirakata; Hidekazu Majima, Yawata, all of Japan

[73] Assignee: Kabushiki Kaisha Daikin Seisakusho, Neyagawa, Japan

[21] Appl. No.: 630,042

[22] Filed: Jul. 12, 1984

[30] Foreign Application Priority Data

Jul. 18, 1983 [JP] Japan .................................. 58-131652

[51] Int. Cl.⁴ ........................ F16D 13/24; F16D 13/66
[52] U.S. Cl. .............................. 192/70.15; 192/107 R; 192/109 A
[58] Field of Search ............... 192/70.14, 70.15, 70.28, 192/107 R, 109 A

[56] References Cited

U.S. PATENT DOCUMENTS

| | | | |
|---|---|---|---|
| 1,446,657 | 2/1923 | Parsons | 192/70.15 |
| 2,393,398 | 1/1946 | Nabstedt | 192/70.15 |
| 4,300,669 | 11/1981 | Browne | 267/161 |
| 4,422,538 | 12/1983 | Krumm | 192/70.14 |

Primary Examiner—Leonard E. Smith
Assistant Examiner—Jane E. Obee
Attorney, Agent, or Firm—Armstrong, Nikaido, Marmelstein & Kubovcik

[57] ABSTRACT

A clutch disc positional between a driving flywheel and a pressure plate characterized in that the clutch disc is composed of a central disc-shaped disc section perpendicular to the driving axis of the flywheel and an outer peripheral cone-shaped disc section. Power transmission is commenced at the disc-shaped disc section when the clutch is engaged.

3 Claims, 7 Drawing Figures

FRONT

FRONT

CLUTCH

BACKGROUND OF THE INVENTION

This invention relates to a clutch for use in an industrial machinery, an automobile etc.

In a conventional clutch, a disc-shaped clutch disc is interposed between an input flywheel and a pressure plate. Torque is transmitted from the flywheel to an output shaft at the center of the clutch disc when the clutch disc is pressed between the flywheel and pressure plate. However, there have been disadvantages that a torque shock, generated during engagement of the clutch, produces slippage. Because the conventional clutch has disc-shaped form both clutch size and pedal stepping force, in comparision to a clutch torque capacity, (a magnitude of transmittable torque) have become large.

An object of a first invention is to decrease size and pedal stepping force in relation to the clutch torque capacity. A further object is to prevent shock and chattering at the time of engaging a clutch to improve the feeling of engagement and disengagement thereof.

To accomplish the above objects, in a clutch wherein a clutch disc is interposed between a flywheel and a pressure plate, in the instant invention the clutc disc is composed of a central side disc-shaped disc section and an outer peripheral side cone-shaped disc section. The clutch disc is interposed between a flywheel and a pressure plate. The clutch disc is composed of a central side disc-shaped disc section and an outer peripheral side cone-shaped disc section, transmission is commenced at the disc-shaped disc section when the clutch is engaged.

DETAILED DESCRIPTION OF THE INVENTION

Figure 1:
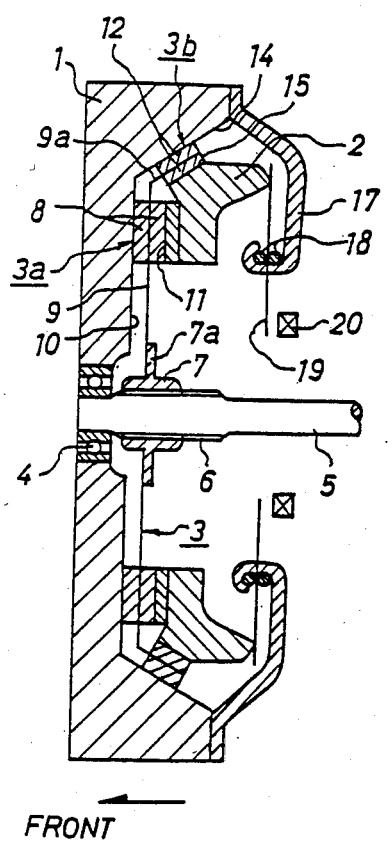
FIG. 1 is a vertical sectional schematic drawing of the clutch of the invention.

In FIG. 1, flywheel 1 is fastened to an end portion of a crank shaft of a not-shown. Front end portion of a driven shaft 5 is supported by an engine, central bearing 4. Driven shaft 5 is connected to an input shaft of a speed changer. Hub 7 of the clutch disc 3 fits onto a spline 6 and is freely slidable thereon.

Clutch disc 3 is formed in such a manner that the central side disc-shaped disc section 3a and the outer peripheral side cone-shaped disc section 3b are concentically arranged around hub 7. The disc-shaped disc section 3a is formed by molding a pair of annular facings 8 on both front and rear surfaces of a driven plate 9. The facings 8 face friction surfaces 10, 11 normal to the shaft 5 of the flywheel 1 and the pressure plate 2, respectively. An inner peripheral portion of the plate 9 is fastened to a flange 7a of the hub 7 by means of rivets, not shown.

The cone-shaped disc section 3b is formed by molding a pair of cone-shaped facings 12 on opposite surfaces of a cone-shaped portion 9a of the plate 9, and face cone-shaped friction surfaces 14, 15 of the flywheel 1 and the pressure plate 2, respectively. The cone-shaped portion 9a is formed integrally with an outer peripheral portion of the plate 9 projecting radially outwardly from disc section 3a. Radial slits are provided on the cone-shaped portion 9a to enable the plate to function as a cushioning plate absorbing axial and radial shocks.

The pressure plate 2 is interconnected to a clutch cover 17 through plural straps (not shown) extending in the circumferential direction. Peripheral portion of clutch cover 17 is fastened to the flywheel 1 by means of bolts, not shown. A pair of wire rings 18 are held by an inner peripheral portion of the clutch cover 17. Diaphragm spring 19 is supported between wire rings 18, 18. Thus the diaphragm spring 19 is attached to the clutch cover 17 through wire rings 18. An outer peripheral portion of the diaphragm spring 19 contacts pressure plate 2 and an inner peripheral portion thereof faces release bearing 20.

Figure 2:
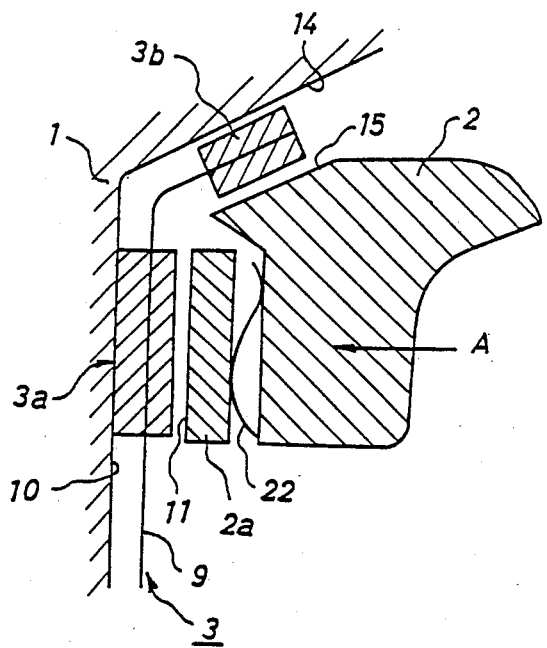
FIG. 2 is a partially enlarged drawing showing a disengaged condition of the clutch shown in FIG. 1.

Disc-shaped pressure plate 2a is supported by the pressure plate 2 through spring 22, as shown in FIG. 2. An annular body, having a sectional form of FIG. 2, may be employed as the spring 22. Spring 22 is fastened to both the pressure plates 2, 2a by means of plural rivets, not shown. Positional relation between the friction surface 11 of the disc-shaped pressure plate 2a and the cone-shaped friction surface 15 of the pressure plate 2 is preselected in such a manner that, when the pressure plate 2 moves in the direction of arrow A (FIG. 2) to cause engagement of the clutch, the friction surface 11 first makes the disc-shaped disc section 3a begin to contact with the flywheel 1 and then, about at the time when the pressure plate 2 moves and a transmitted torque reaches T1, FIG. 3, the cone-shaped friction surface 15 begins to press the cone-shaped disc section 3b against the flywheel 1.

Function of the clutch will be described hereunder. FIG. 1 shows an engaged condition of the clutch. When a clutch pedal is pressed to move release bearing 20 forward (in the left direction of FIG. 2) and make the diaphragm spring 19 bend backward to pull back the pressure plate 2, the clutch disc 3 will released from the flywheel 1 and the pressure plate 2 (FIG. 2) to cause disengagement of the clutch. Next, when the clutch pedal is gradually released, the pressure plate 2 will advance in the direction of arrow A of FIG. 2 and the disc-shaped pressure plate 2a will first begin to press the disc-shaped disc section 3a against the friction surface 10 of the flywheel. Then, when a forward displacement of the pressure plate 2 increases and the transmitted torque also increases according thereto to reach a point P1 as shown by a solid line of FIG. 3, the pressure plate 2 will begin to press cone-shaped disc section 3b against the cone-shaped friction surface 14 of the flywheel 1. The engagement of the clutch will be completed at a point P2. A broken line of FIG. 3 shows a characteristic of conventional clutch which has no cone-shaped disc section.

Figure 3:
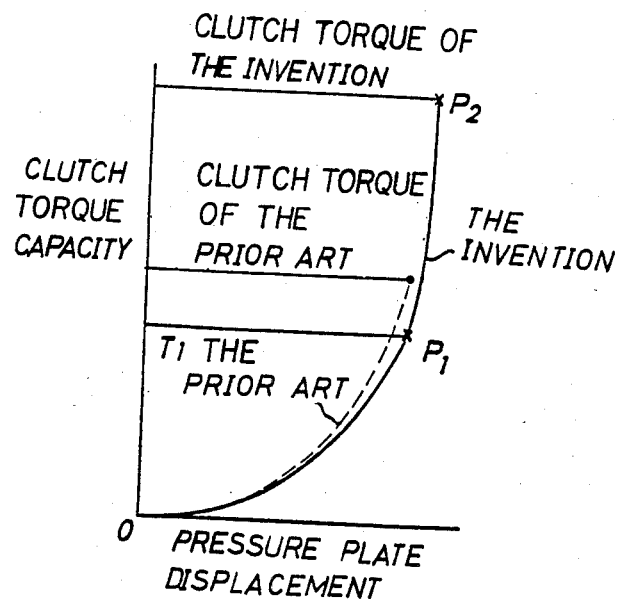
FIG. 3 is a graph showing a relation between a clutch torque capacity and a pressure plate displacement.

As seen from FIG. 3, the clutch torque capacity will be increased by a large margin when the cone-shaped disc section 3b shown by FIG. 2 is provided. Namely, a conventional cone clutch has a disadvantage of producing a shock due to sharp engagement at the beginning of engagement and a chattering due to possible uneven contact. However it has an advantage of providing a large torque transmitting ability. Since the clutch of the present invention is so devised that the cone clutch, having these characteristics, functions immediately before completion of engagement of conventional clutch, a clutch having a large torque capacity can be obtained without accompanying shock and chattering which would be generated by the conventional cone clutch. Moreover, after completion of the engagement, slippage will not occur because the clutch is locked even when shock torque is produced.

As described above, the torque capacity of the entire clutch is increased according to the invention. The clutch size is decreased for constant torque capacity. Further, the clutch releasing load (clutch stepping force) is decreased. The clutch pedal force can be decreased as compared with a conventional clutch having the same torque capacity.

Since the disc clutch section engages first at the beginning of engagement, troubles such as shock, chattering etc. peculiar to a cone clutch can be solved. Because the cone clutch locks immediately before completion of engagement, shock and chattering etc. at the time of engagement thereof can be avoided and feeling of clutch engagement and disengagement can be improved. Further, when the spring 22 is disposed between the pressure plates 2, 2a as shown by the embodiment of FIG. 2, cushioning for the clutch disc 3 will become unnecessary. Combined use with a so-called mold type clutch disc, in which a facing is molded on a plate, will become possible and an elongation of clutch service life will be accomplished.

Figure 4:
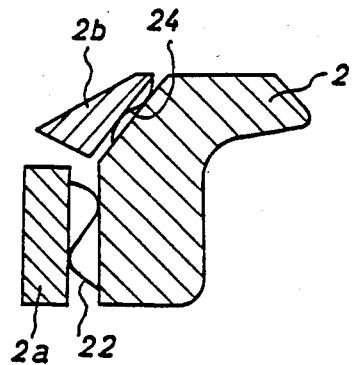
FIGS. 4, 5 and 6 are partial vertical sectional drawings of other embodiments of the invention.
Figure 1A:
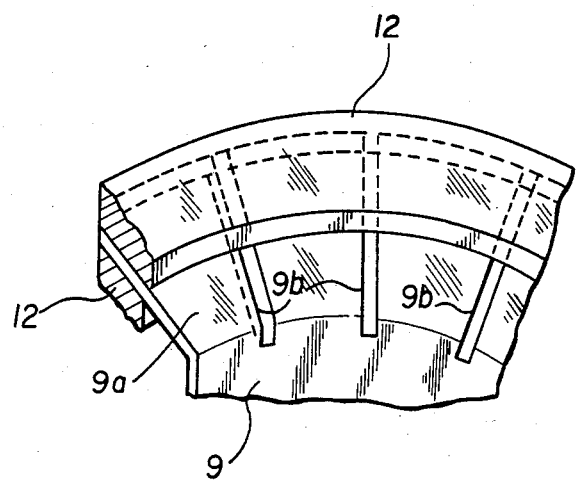
FIG. 1a is a partial front view, taken in the direction of arrow "a", FIG. 1, of the outer cone-shaped disc section of the clutch of FIG. 1.

As illustrated in FIG. 4, a cone-shaped pressure plate 2b can be attached to a pressure plate 2 through a spring 24. In this instance, the components are so arranged that a deflection of a spring 22 disposed between the pressure plate 2, 2a becomes larger than a deflection of the spring 24 disposed between the pressure plates 2, 2b. Disc-shaped pressure plate 2a contacts with a facing earlier than the plate 2. Since locking of the cone clutch is done gradually according to this construction, shock and chattering can be avoided over the entire range of clutch engagement stroke and the feeling of engagement and disengagement can be improved.

The outer peripheral side cone-shaped disc section 3b, FIGS. 1 and 2, may be divided into plural pieces on a circumference. Plate cone portion 9a may also be divided into plural pieces on the same circumference in this instance. Further, the cone portion 9a may be formed of a spring steel plate.

The inner peripheral side disc-shaped disc section 3a is liable to be worn out faster than the outer peripheral side cone-shaped disc section 3b. If a wear-resisting metallic or cerametallic facing is employed for the disc-shaped disc section 3a and an organic facing is employed for the cone-shaped disc section 3b wear of the facings of both clutches, 3a, 3b can be made uniform even for use over a long period. The position of point P1 of FIG. 3 does not change, and the characteristics can be stabilized for a long time.

Figure 5:
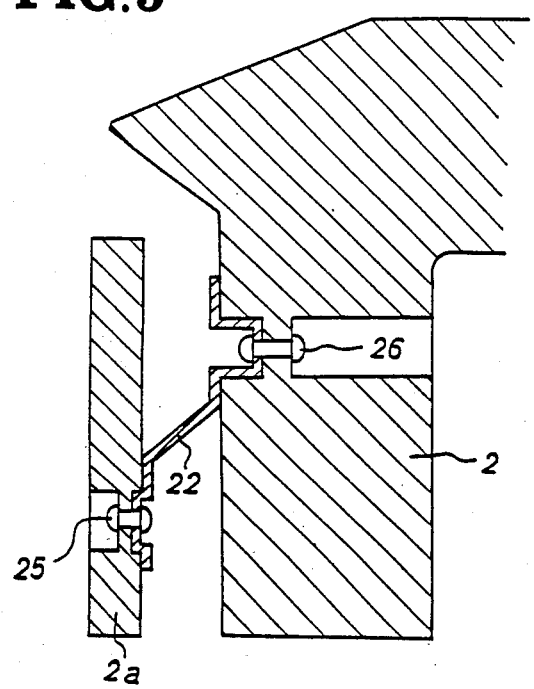

The spring 22 may be fastened to the pressure plates 2a, 2 by means of rivets 25, 26 as shown in FIG. 5.

Figure 6:
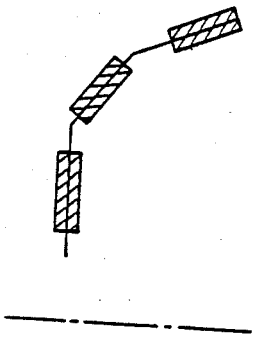

The cone-shaped disc section 3b can be divided into plural pieces having different distances from the clutch center so that an outer side piece may be provided with a gradual larger inclination angle than an inner side one. In this instance, a shape of the entire clutch disc will become a bowl-like shape for increasing the torque capacity in comparison to the size (FIG. 6).

What is claimed is:

1. A clutch interposing a clutch disc between driving flywheel and a pressure plate characterized in that the clutch disc is composed of a first area substantially perpendicular to the driving axis of said flywheel and having friction surface on the opposite sides thereof and an outer peripheral cone-shaped area radially outward from said first area and having friction surfaces on the opposite sides thereof, said cone-shaped area being divided into plural pieces having different distances from the clutch center so that an outer side piece is provided with a gradual larger inclination angle than an inner side piece.

2. A clutch interposing a clutch disc between a driving flywheel and a pressure plate characterized in that the clutch disc is composed of a first area substantially perpendicular to the driving axis of said flywheel and having friction surfaces on the opposite sides thereof and an outer peripheral cone-shaped area radially outward from said first area and having friction surfaces on the opposite sides thereof, the power transmission from said driving flywheel and said pressure plate to said clutch disc commencing when said first clutch disc area is engaged by said flywheel and said pressure plate said cone-shaped area being divided into plural pieces having different distances from the clutch gear so that an outer side piece is provided with a gradual larger inclination angle than an inner side piece.

3. A clutch interposing a clutch disc between a driving flywheel and a pressure plate characterized in that the pressure plate includes a disc-shaped plate at the pressure side of said pressure plate and mounted thereon with a spring and the clutch disc is composed of a first area substantially perpendicular to the driving axis of said flywheel and having friction surfaces on the opposite sides thereof and an outer peripheral cone-shaped area radially outward from said first area and having friction surfaces on the opposite side thereof, the power transmission from said driving flywheel and said pressure plate to said clutch disc commencing when said first clutch disc area is engaged by said flywheel and said pressure plate, said pressure plate further includes a cone-shaped plate at the pressure side of said pressure plate and mounted thereon with a spring peripheral of the pressure plate, the deflection of said cone-shaped plate spring being smaller than the deflection of said spring interposed between the pressure plate and the disc-shaped plate so that said disc-shaped plate contacts said perpendicular first area friction surfaces earlier that said cone-shaped plate contacts said outer peripheral cone-shaped friction surfaces.

* * * * *